United States Patent
Hefner

(10) Patent No.: US 9,039,954 B2
(45) Date of Patent: May 26, 2015

(54) INJECTION TOOL FOR PRODUCING COMPONENTS BY INJECTION MOULDING

(76) Inventor: Christian Hefner, Fischlham (AT)

(*) Notice: Subject to any disclaimer, the term of this patent is extended or adjusted under 35 U.S.C. 154(b) by 203 days.

(21) Appl. No.: 13/807,930

(22) PCT Filed: Jun. 27, 2011

(86) PCT No.: PCT/EP2011/060689
§ 371 (c)(1),
(2), (4) Date: Mar. 21, 2013

(87) PCT Pub. No.: WO2012/000924
PCT Pub. Date: Jan. 5, 2012

(65) Prior Publication Data
US 2013/0175735 A1   Jul. 11, 2013

(30) Foreign Application Priority Data
Jul. 1, 2010   (AT) .................. A 1118/2010

(51) Int. Cl.
 B29C 45/03   (2006.01)
 B29C 45/28   (2006.01)
 B29C 45/76   (2006.01)
 B29C 45/27   (2006.01)
 B29C 45/26   (2006.01)

(52) U.S. Cl.
 CPC ............ B29C 45/03 (2013.01); B29C 45/2756 (2013.01); B29C 45/281 (2013.01); B29C 45/7686 (2013.01); B29C 2045/2687 (2013.01); B29C 2045/2824 (2013.01); B29C 2045/2848 (2013.01); B29C 2945/761 (2013.01); B29C 2945/7613 (2013.01); B29C 2945/7629 (2013.01); B29C 2945/76464 (2013.01); B29C 2945/76568 (2013.01); B29C 2945/76755 (2013.01); B29C 2945/76936 (2013.01)

(58) Field of Classification Search
 CPC ............ B29C 2045/2824; B29C 2045/2848; B29C 2945/76568; B29C 2945/76755; B29C 45/2756; B29C 45/281
 USPC ............. 264/328.8, 40.5, 40.7; 425/145, 562, 425/570, 572
 See application file for complete search history.

(56) References Cited

U.S. PATENT DOCUMENTS

| 6,228,309 B1 * | 5/2001 | Jones et al. ................ 264/328.8 |
| 7,686,603 B2 * | 3/2010 | Fairy ............................ 425/130 |
| 2007/0122519 A1 * | 5/2007 | Yu ................................. 425/562 |

FOREIGN PATENT DOCUMENTS

| CH | 686 715 A5 | 6/1996 |
| EP | 1 013 395 A1 | 6/2000 |
| EP | 1 961 549 A1 | 8/2008 |
| JP | 2001 170977 A | 6/2001 |

* cited by examiner

*Primary Examiner* — Jill Heitbrink
(74) *Attorney, Agent, or Firm* — Jordan IP Law, LLC; Todd A. Vaughn

(57) ABSTRACT

An injection tool for the production of components by an injection-molding method, the injection tool including several cavities for shaping one respective product, an injection nozzle for injecting plastic materials for each cavity, and an actuating device. The injection nozzle has an injection channel which can be closed by a nozzle needle in order to control the injection process. The actuating device is arranged to move the nozzle needle in an axial direction between a first end position and a second end position, with an adjustable stop being provided which defines the first end position.

20 Claims, 2 Drawing Sheets

INJECTION TOOL FOR PRODUCING COMPONENTS BY INJECTION MOULDING

CROSS-REFERENCE TO RELATED APPLICATIONS

The present application is a National Stage Application of PCT International Application No. PCT/EP2011/060689 (filed on Jun. 27, 2011), under 35 U.S.C. §371, which claims priority to Austrian Patent Application No. A1118/2010 (filed on Jul. 1, 2010), which are each hereby incorporated by reference in their respective entireties.

TECHNICAL FIELD

The invention relates to an injection tool for the production of components by an injection-molding method, comprising several cavities for shaping one respective product, an injection nozzle for injecting plastic materials for each cavity, and an actuating device. The injection nozzle has an injection channel which can be closed by a nozzle needle in order to control the injection process. The actuating device is arranged to move the nozzle needle in an axial direction between a first end position and a second end position, with an adjustable stop being provided which defines the first end position.

BACKGROUND OF THE INVENTION

Conventional injection tools for performing injection-molding methods comprise a nozzle needle which is adjustable in the axial direction in order to control the injection process. Conventional needle-closing systems are driven pneumatically, hydraulically, mechanically or electrically. In this process, the needle is movable between a first end position (open) and a second end position (closed).

In order to control the injection quantity and the speed of the material flow, it is known to arrange the first end position in an adjustable way in order to reduce the opening cross section in the region of the needle tip in a selective way. A constant product quality can be ensured in this manner in an injection tool with a plurality of cavities because as a result of inevitable temperature differences, surface conditions, different distributor channels and the like, even when the injection tool is arranged in a careful way, it is not possible to avoid differing flow conditions during the inflow of the material. These irregularities can be compensated by setting the opening position of the nozzle needle, so that the quality of the produced end products can be ensured. It is known to set the end position of the nozzle needle mechanically, which is only possible however with an interruption of the production process. The setting process is respectively complex and leads to a reduction in the production capacity as a result of the interruptions in production. Furthermore, there is always the likelihood of the production of rejects after a standstill of the injection tool.

In order to avoid these disadvantages, mechanical systems are known which enable the setting of the flow cross-section in a tool with several cavities. As a result of the complexity of these apparatuses, they are limited to tools with a relatively low number of cavities, which furthermore need to have an adjusted arrangement (linear) in order to take the requirements of the adjusting device into account.

AT 5 750 U discloses an injection nozzle in which mechanical adjustability of the nozzle needle is provided. In this specification, the production process needs to be interrupted repeatedly in order to adjust the opening stroke. In this respect, the nozzle needle of the injection nozzle is arranged as a rigid connection between the piston of the nozzle needle and the stop screw.

DE 40 32 500 A1 describes an injection-molding device in which the digitally controlled stop piston and receiving piston of the injection nozzle are in connection with one another. This apparatus has a complex configuration and is susceptible to malfunctions.

EP 1 961 549 A1 discloses a needle actuating apparatus, in which embodiments of the piston are described among other things with which the nozzle needle is connected. The piston with which the nozzle needle is connected can be driven electrically, which is respectively complex.

U.S. Pat. No. 5,078,589 A discloses an injection apparatus in which the nozzle needle is connected to a locking screw.

SUMMARY OF THE INVENTION

It is the object of the present invention to avoid the disadvantages as mentioned above and to provide an injection tool which allows precisely setting the injection quantity and injection speed without requiring any interruption of the production process. The apparatus shall be simple and cost-effective, and ensure high production quality.

It is provided in accordance with the invention that the adjustable stop is arranged as a screw which is formed coaxially in relation to the nozzle needle and is adjustable by an electric motor. The relevant aspect of the invention is that it is not required to perform the adjusting movement of the nozzle needle itself in an electric manner, so that a simple and cost-effective pneumatic drive can be used for example. The electric motor, which is provided individually for each nozzle needle, merely adjusts a stop for the nozzle needle, so that an electric motor of comparatively low power and torque can be used. The apparatus in accordance with the invention can therefore be produced in a simple and cost-effective way, but is still highly flexible because in principle every single cavity can be newly calibrated after each individual shot. As a result of the adjustment of the stop by means of an electric motor, there will be a precise setting of injection quantity and injection speed without interrupting the production process. In the present invention, the nozzle needle represents a separate unit which is separated from the electrically adjustable stop.

Preferably, the electric motor is arranged as a stepper motor, which means a setpoint position for the screw can be predetermined by the control device which defines the first end position of the nozzle needle. The desired position will be accessed by the stepper motor in a precise manner with high repeat accuracy.

The injection tool in accordance with the invention is especially preferably suitable for use in the cold runner process, i.e. for the processing of silicone and similar materials. The entire injection system will be held in a relatively narrow temperature range right up to the cavity in order to ensure the required minimum temperature on the one hand, which ensures a sufficiently low viscosity of the material, and premature setting is prevented by the limitation of the maximum temperature on the other hand.

As a result of the injection tool in accordance with the invention, every electric motor can be triggered individually and independently, with no mechanical connection being required between the individual injection nozzles. The number and the arrangement of the cavities is not subject to any additional limitations by the adjusting system for the nozzle needle and can therefore be optimized within wide margins with respect to the products to be produced.

It is a special advantage of the solution in accordance with the invention that the adjusting device also allows sealing the injection nozzle entirely. As a result, a cavity can also be deactivated directly during the production process, if so required as a result of any problems.

Furthermore, the present invention also relates to a method for producing products by an injection-molding method in which the plastic material is injected simultaneously into several cavities of an injection tool, with the plastic being introduced into each cavity via an injection nozzle which can be closed by a nozzle needle in order to define the injection end, and with the injection quantity and speed being determined by an adjustment of a first end position of the nozzle needle.

It is provided in accordance with the invention that the first setting will be adjusted individually for each injection nozzle in an electromotive manner. This adjustment can especially occur in a continuous manner during the production process, i.e. in the most extreme of cases that a separate adjustment process will be performed for each shot when a respective sensor arrangement is provided for example in order to provide measuring results for each cavity which are required for the optimization of the injection process. The adjustment of the stop can be performed in the interval between the individual injection processes, i.e. therefore directly before the next injection process, when the stop is not loaded.

The setting of the tool with several cavities is a difficult task which requires much experience because every setting on one cavity will principally also influence the other cavities. It is therefore necessary to consider a start-up phase at the beginning of a production process in which there will be a higher number of rejects. Changes and process fluctuations can occur during production however which have an effect on the filling of the individual cavities and therefore require a re-adjustment of the nozzles.

In order to reduce these difficulties, an especially advantageous embodiment of the invention provides a measuring device for detecting the production quality which is connected with a control device which triggers the electric motors.

An adjusting process can be the adjusted on the basis of an optimized algorithm in this way after each shot, so that is not only possible to find an optimal setting rapidly and without any specialized staff, but also to ensure constant quality over a long period of time.

The measuring device detects both underfilling and excess injection. Underfilling is noticed by reduced weight of the part, reduced dimensions, flow points, notches, improperly defined surfaces or an unfilled transfer. Excess injection is defined by the formation of burrs, increased weight of the part, enlarged dimensions and the like.

The above defects can preferably be detected by a camera which visually examines and evaluates the produced components. It is also possible to draw conclusions on the filling by simply weighing the components.

Feedback control preferably occurs automatically, but can also be provided semi-automatically, i.e. an operator can perform interventions. It is also possible to provide a manual operating mode.

BRIEF DESCRIPTION OF THE DRAWINGS

The present invention will be explained below in closer detail by reference to the embodiment shown in the drawing, wherein.

DETAILED DESCRIPTION OF EMBODIMENTS

Figure 1:
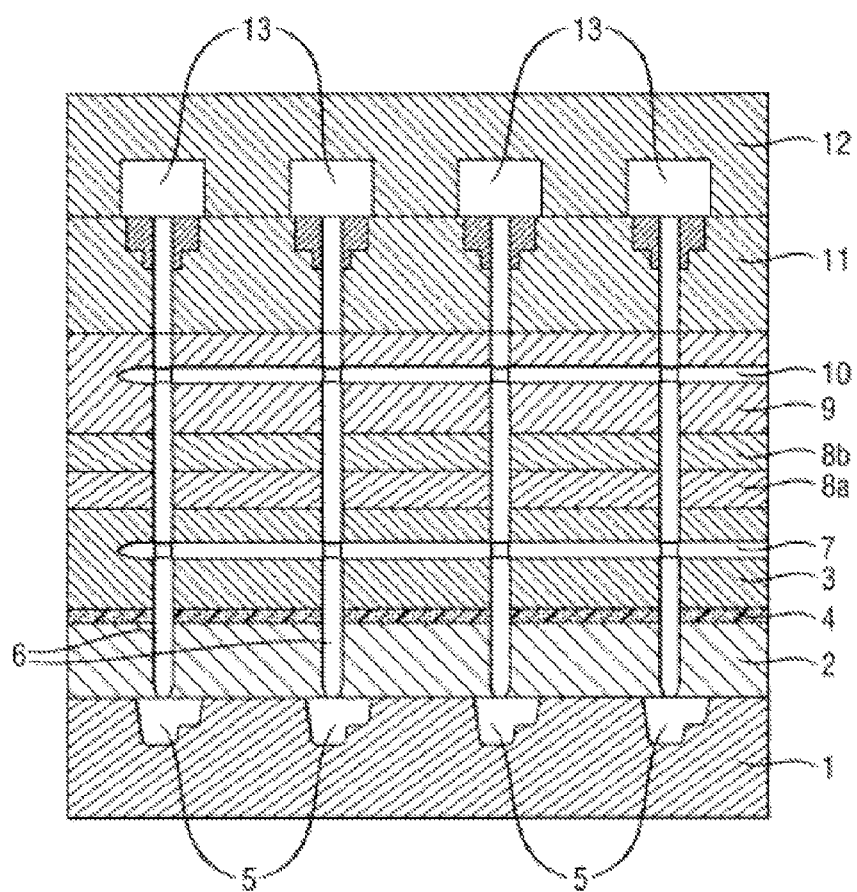
FIG. 1 schematically illustrates an injection tool in accordance with the invention.

The injection tool of FIG. 1 includes several molding plates 1, 2, 3 with a thermal insulating layer 4 between the plates 2 and 3. Several cavities 5 are arranged in the molding plate 1, in which work pieces (not shown) are produced by an injection-molding process. Injection nozzles 6 are inserted into the molding plates 2 and 3, said injection nozzles being supplied with plastic via a feed channel 7, which plastic represents the raw material. Further tool plates 8a, 8b, 9 are connected to the third molding plate 3, in which a pneumatic channel 10 is arranged which is provided for supplying the injection nozzles 6 with compressed air. A drive for a stop (not illustrated) of the nozzle needle 14 is provided in a further plate 11 and several electric motors 13 are arranged in an end plate 12.

Figure 2:
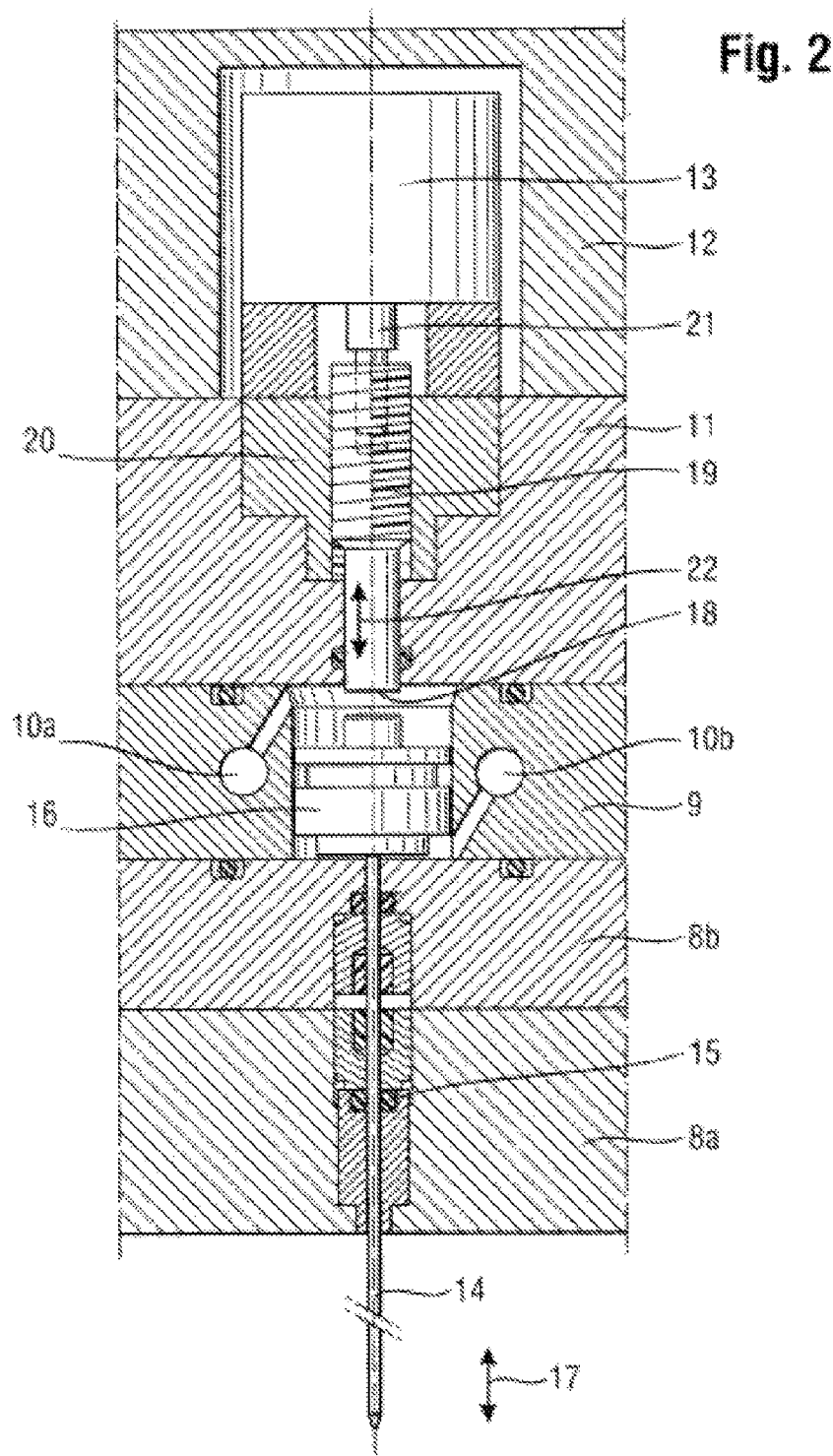
FIG. 2 illustrates a detail of FIG. 1.

FIG. 2 shows an adjusting apparatus for the stop of the nozzle needle 14 in a detailed view. The nozzle needle 14 is used in the known manner for closing a nozzle opening in order to enable the start and the end of the injection process in a precise way. Seals 15 are used for preventing the rise of the material beyond the plates 8a, 8b during the injection-molding process. A piston 16 is used for actuating the nozzle needle 14. For this purpose, compressed air is supplied via the channels 10a, 10b in order to move the nozzle needle 14 in the direction of the double arrow 17. An adjustable stop 18 is provided on the upper side of the piston 16, said adjustable stop being fixed to a screw-jack 19 which is held in an insert 20 of the plate 11. A shaft stub 21 of the motor 13 engages in the screw-jack 19 and twists the same in such a way that the stop 18 will move in the axial direction (double arrow 22).

This allows performing a fine adjustment of the material flow for every single cavity during the production process.

What is claimed is:

1. An injection tool comprising:
   a plurality of molding plates;
   a plurality of cavities arranged in one of the molding plates, and configured to shape a product via an injection molding process;
   a plurality of injection nozzles in communication with a respective one of the cavities and configured to inject a fluid material into the respective one of the cavities, the injection nozzles each having an injection channel which during operation of the invention tool is closed by a respective nozzle needle;
   a plurality of actuating devices configured to move a respective nozzle needle in an axial direction between a first end position and a second end position;
   a plurality of adjustable stops for a respective nozzle needle and which defines the first end position, each adjustable stop comprising a screw arranged coaxially in relation to the nozzle needle;
   a plurality of motors to moveably adjust a respective adjustable stop; and
   a screw-jack held in an insert of one of the molding plates, to which is connected the adjustable stop, and which is to be engaged by the motor to during an adjustment of the adjustable stop in an axial direction to thereby define the first end position.

2. The injection tool of claim 1, wherein each motor comprises an electric motor.

3. The injection tool of claim 2, wherein the electric motor comprises a stepper motor.

4. The injection tool of claim 1, wherein each actuating device comprises a pneumatic actuating device.

5. The injection tool of claim 1, wherein the injection tool comprises a cold runner injection tool.

6. The injection tool of claim 1, further comprising a control device to control each motor independently.

7. The injection tool of claim 1, wherein the first end position is adjustable up to a closing position for the injection nozzle.

8. The injection tool of claim 1, wherein the adjustable stop is screwed to the screw-jack.

9. An injection apparatus, comprising:
an injection tool including:
a plurality of molding plates;
a plurality of cavities arranged in one of the molding plates, and configured to shape a product via an injection molding process;
a plurality of injection nozzles in communication with a respective one of the cavities and configured to inject a fluid material into the respective one of the cavities, the injection nozzles each having an injection channel which during operation of the invention tool is closed by a respective nozzle needle;
a plurality of actuating devices configured to move a respective nozzle needle in an axial direction between a first end position and a second end position;
a plurality of adjustable stops for a respective nozzle needle and which defines the first end position, each adjustable stop comprising a screw arranged coaxially in relation to the nozzle needle;
a plurality of motors to moveably adjust a respective adjustable stop, and
a screw-jack held in an insert of one of the molding plates, to which is connected the adjustable stop, and which is to be engaged by the motor to during an adjustment movement of the adjustable stop in an axial direction to thereby define the first end position,
a measuring device to detect a production quality of the injection tool; and
a feedback control device operative connected to the measuring device and which is configured to activate the motors.

10. The injection apparatus of claim 9, wherein the measuring device is configured to visually detect the production quality.

11. The injection apparatus of claim 9, wherein the measuring device is arranged as a balance.

12. The injection apparatus of claim 9, wherein each motor comprises an electric motor.

13. The injection apparatus of claim 12, wherein the electric motor comprises a stepper motor.

14. The injection apparatus of claim 9, wherein each actuating device comprises a pneumatic actuating device.

15. The injection apparatus of claim 9, wherein the injection tool comprises a cold runner injection tool.

16. The injection apparatus of claim 9, further comprising a control device to control each motor independently.

17. The injection apparatus of claim 9, wherein the first end position is adjustable up to a closing position for the injection nozzle.

18. A method for producing products by injection-molding, the method comprising:
providing an injection tool including a plurality of molding plates, a plurality of cavities arranged in one of the molding plates, and configured to shape a product via an injection molding process, a plurality of injection nozzles in communication with a respective one of the cavities and configured to inject a plastic material into the respective one of the cavities, the injection nozzles each having an injection channel which during operation of the invention tool is closed by a respective nozzle needle, a plurality of actuating devices configured to move a respective nozzle needle in an axial direction between a first end position and a second end position, a plurality of adjustable stops for a respective nozzle needle and which defines the first end position, each adjustable stop comprising a screw arranged coaxially in relation to the nozzle needle, a plurality of motors to moveably adjust a respective adjustable stop, and a screw-jack held in an insert of one of the molding plates, to which is connected the adjustable stop, and which is to be engaged by the motor to during an adjustment movement of the adjustable stop in an axial direction;
simultaneously injecting the plastic material into the plurality of cavities of the injection tool via the injection nozzles;
determining an injection quantity and an injection speed by an adjustment of a first end position of the nozzle needle; and
individually adjusting the first end position of each injection nozzle electro-mechanically.

19. The method of claim 18, wherein individually adjusting the first end positions of the nozzle needles is performed directly before the injection process.

20. The method of claim 18, wherein the production quality is monitored continually and the first end position of each injection nozzle is individually readjusted automatically.

* * * * *